(12) United States Patent
Dow, III

(10) Patent No.: US 7,584,494 B2
(45) Date of Patent: Sep. 1, 2009

(54) CABLE TO WIRELESS CONVERSION SYSTEM FOR IN-HOME VIDEO DISTRIBUTION

(76) Inventor: Leo F. Dow, III, 1314, 22nd St. NW., Roanoke, VA (US) 24017

( * ) Notice: Subject to any disclaimer, the term of this patent is extended or adjusted under 35 U.S.C. 154(b) by 850 days.

(21) Appl. No.: 10/878,739

(22) Filed: Jun. 28, 2004

(65) Prior Publication Data

US 2005/0289633 A1 Dec. 29, 2005

(51) Int. Cl.
*H04N 7/16* (2006.01)
(52) U.S. Cl. .......................................... 725/81; 725/82
(58) Field of Classification Search ................... 725/81
See application file for complete search history.

(56) References Cited

U.S. PATENT DOCUMENTS

| | | | |
|---|---|---|---|
| 5,418,559 A | | 5/1995 | Blahut |
| 5,708,961 A | | 1/1998 | Hylton et al. |
| 5,880,721 A | * | 3/1999 | Yen .............................. 725/81 |
| 6,263,503 B1 | * | 7/2001 | Margulis ....................... 725/81 |
| 6,286,142 B1 | | 9/2001 | Ehreth |
| 6,288,749 B1 | | 9/2001 | Freadman |
| 6,481,010 B2 | * | 11/2002 | Nishikawa et al. ............ 725/44 |
| 6,493,875 B1 | | 12/2002 | Eames et al. |
| 6,580,452 B1 | * | 6/2003 | Gangitano ................... 348/180 |
| 6,622,307 B1 | | 9/2003 | Ho |
| 6,647,015 B2 | | 11/2003 | Malkemes et al. |
| 6,798,459 B1 | * | 9/2004 | Izumi ........................... 348/552 |
| 6,930,661 B2 | * | 8/2005 | Uchida et al. .................. 345/87 |
| 7,137,138 B2 | * | 11/2006 | Shibata et al. ................. 725/81 |
| 2004/0123322 A1 | * | 6/2004 | Erkocevic et al. ............. 725/81 |
| 2007/0200727 A1 | * | 8/2007 | Sakamoto .............. 340/825.25 |

* cited by examiner

*Primary Examiner*—John W Miller
*Assistant Examiner*—Chris Parry
(74) *Attorney, Agent, or Firm*—Dale J. Ream

(57) ABSTRACT

A system is provided for distributing video signals by wireless transmission to a remote TV. The system includes a base transmitter, a remote receiver and a handheld remote control. The base transmitter has a TV tuner for selecting a channel from a cable TV signal, an input switch for selecting one of a plurality of video sources including the TV tuner, and a video transmitter and antenna for transmitting the selected video signal via a wireless broadcast. The remote receiver has a remote video antenna and video receiver for receiving the video signal broadcast by the base transmitter and passing the video signal to the remote TV. The remote receiver also has an IR receiver and a remote control transmitter and antenna for receiving IR control signals from the handheld remote control and broadcasting the control signals to the base transmitter for controlling the input switch and the TV tuner.

1 Claim, 4 Drawing Sheets

CABLE TO WIRELESS CONVERSION SYSTEM FOR IN-HOME VIDEO DISTRIBUTION

BACKGROUND OF THE INVENTION

1. Field of the Invention

The present invention relates generally to in-home communications systems for distributing audio and video signals to a plurality of locations. In particular, the present invention relates to a system for converting cable TV and other audio/video signals into wireless signals that can be distributed to TV sets at remote locations.

2. Description of the Related Art

Many homes contain multiple sources of audio/visual entertainment and communications signals, including cable or satellite TV feeds, and DVD, DVR, CD and/or VCR feeds. The cable or satellite TV feeds typically enter a residence and are routed via coaxial cables to each of a user's TV sets, cable set top boxes, satellite receivers, or the like. As a result, homes are often covered with cables, wires and other communications connections, and each time a TV set is to be moved from one location to another, the cabling must be rerouted and the connections moved. This is an inconvenience that also often leads to noisy connections and poor signal quality as a result of cutting and splicing the cabling.

A number of systems have been developed for wireless distribution of audio/visual signals. For example, U.S. Pat. No. 5,023,931 issued to Streck et al. discloses a system for transmitting a wireless signal from a VCR to a TV set. The output of the VCR is fed into a transmitter and sent to the TV receiver;

U.S. Pat. No. 5,708,961 issued to Hylton et al. discloses a system that provides wireless distribution of multiplexed channels from a digital broadband network to a customer's residence. A transmitter provides a wireless broadcast of the digital signal throughout the customer's residence. Terminal devices, such as cable set top boxes, are equipped with an antenna to receive the wireless broadcast. The terminal devices also have circuitry to process selected information from the broadcast for display on an associated TV set. However, this system does not distribute audio/video signals from the user's associated audio/video equipment, such as VCR, DVR and DVD players, to the remote terminal devices.

U.S. Pat. No. 6,647,015 issued to Malkemes et al. discloses a broadband, wireless network having a gateway for receiving input signals from a cable TV feed, a telephone system, a satellite TV feed, and the like. A plurality of receiver nodes communicate with the gateway through a wireless system. The gateway accepts all incoming communications and broadcasts these signals throughout a residence.

While these prior systems are presumably suitable for their intended purposes, there remains a need in the industry for an improved system for distributing video signals throughout a residence from multiple sources using a wireless broadcast.

SUMMARY OF THE INVENTION

An object of the present invention is to provide a system for distributing video signals throughout a residence or other building from multiple sources using wireless technology that overcomes the problems and limitations of the prior art systems described above.

A further object of the present invention is to provide a system for distributing video signals throughout a user's residence or other building from multiple sources, including a cable TV feed, and various audio/video components, such as a DVR, DVD player, VCR and the base TV set.

A further object of the present invention is to provide a system for distributing video signals throughout a user's residence or other building in a manner that allows different TV shows to be viewed on multiple TV sets at the same time.

A further object of the present invention is to provide wireless distribution of video signals from a cable TV feed and other audio/video sources while ensuring a high quality signal with minimal interference or distortion.

In order to accomplish these and other objects of the invention, a system is provided for distributing video signals by wireless transmission to a remote TV set. The system includes a base transmitter, a remote receiver and a handheld remote control. The base transmitter has a TV tuner for selecting a channel from a cable TV signal, an input switch for selecting one of a plurality of video sources including the TV tuner, and a video transmitter and antenna for transmitting the selected video signal via a wireless broadcast. The remote receiver has a remote video antenna and video receiver for receiving the video signal broadcast by the base transmitter and passing the video signal to the remote TV set. The remote receiver also has an infrared ("IR") receiver and a remote control transmitter and antenna for receiving IR control signals from the handheld remote control and broadcasting the control signals to the base transmitter for controlling the input switch and the TV tuner. The base transmitter unit includes an IR emitter for emitting control signals relayed by the remote receiver unit for controlling other peripheral electronic equipment, such as VCRs, DVD players and DVRs.

According to a broad aspect of the present invention, a system is provided for distributing video signals by wireless transmission to a remotely positioned TV set, comprising: a base transmitter unit having a TV tuner, an input switch, a video transmitter, and a base antenna, the input switch having a plurality of inputs for receiving video signals from the TV tuner and at least one other video source; and a remote receiver unit comprising a remote antenna, a video receiver, and a video out port. The video transmitter and base antenna provide a means for broadcasting a video signal from a video source selected by the input switch. The remote antenna and video receiver provide a means for receiving the video signal broadcast by the base transmitter unit and passing the video signal to the video out port for input to the remotely positioned TV set.

According to another aspect of the present invention, a cable to wireless conversion system is provided for distributing video signals by wireless transmission to a remotely positioned TV set. The system comprises: a base transmitter unit, a remote receiver unit, and a remote control unit. The base transmitter unit comprises: a TV tuner, an input switch, a video transmitter, a base video antenna, a base control antenna, a base control receiver, and a CPU. The TV tuner is operable to select a channel from among a plurality of channels contained in a cable TV signal. The input switch is operable to select one of a plurality of video signals received from a plurality of video sources including the TV tuner. The video transmitter and the base video antenna are operable to transmit the selected video signal via a wireless broadcast of high frequency radio signals. The remote receiver unit comprises: a remote video antenna, a video receiver, a video out port, an IR receiver, a remote control transmitter, and a remote control antenna. The remote antenna and the video receiver are operable to receive the video signal broadcast by the base transmitter unit and pass the video signal to the video out port for input to the remotely positioned TV set. The remote control unit comprises: a set of input buttons, a CPU, a memory, and an IR emitter. The remote control unit is operable to generate and emit IR control signals for sending to the base transmitter unit via the remote receiver unit. The IR receiver of the remote receiver unit is operable to receive IR control signals from the remote control unit, and the remote control transmitter and remote control antenna of the remote receiver unit are operable to broadcast the control signals to the base transmitter unit for controlling the video source selection of the input switch and the channel selection of the TV tuner.

Numerous other objects of the present invention will be apparent to those skilled in this art from the following description wherein there is shown and described a preferred embodiment of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
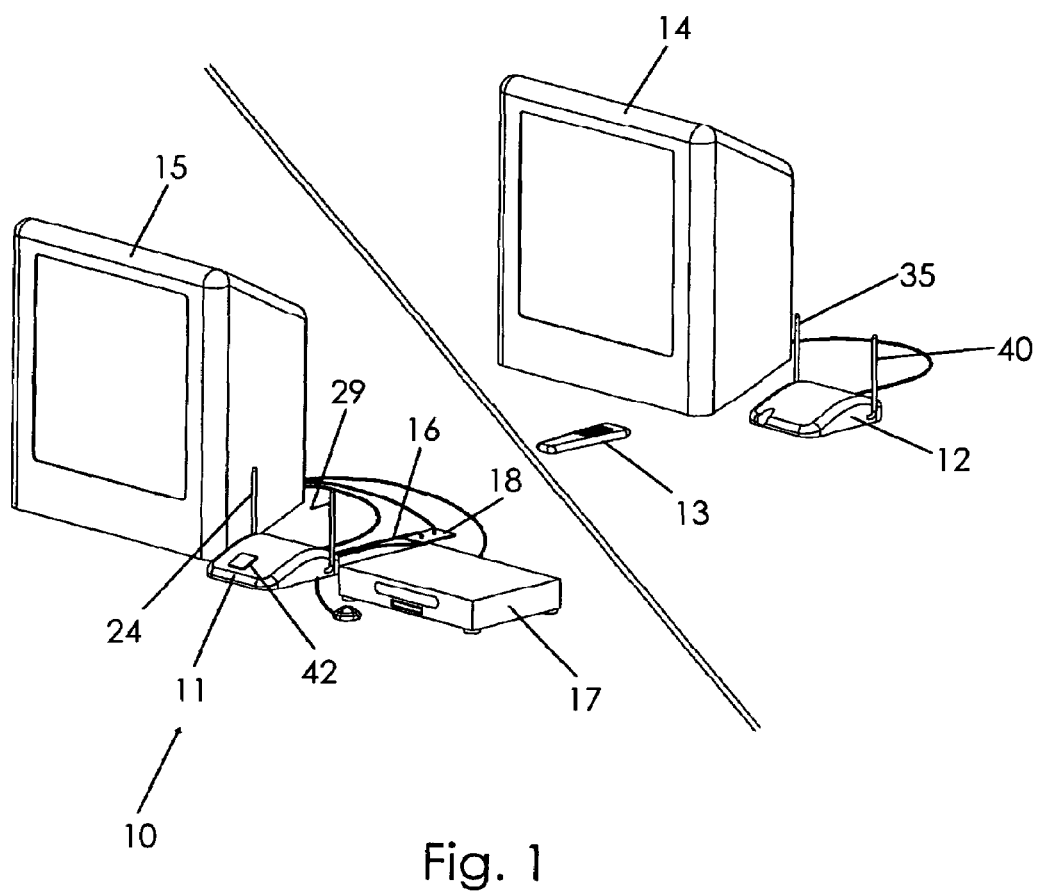
FIG. 1 is a perspective view of a distribution system for converting cable TV and other audio/video signals into a wireless broadcast for delivery to a remote receiver unit for display on a remote TV set.

A cable to wireless conversion system 10 for providing a wireless in-home broadcast of video signals according to a preferred embodiment of the present invention will now be described in detail with reference to FIGS. 1 to 4 of the accompanying drawings.

The system 10 is preferably provided as a kit including a base transmitter unit 11, a remote receiver unit 12 and a handheld remote control unit 13. These components allow a user to broadcast a video signal to a remote TV set 14, while allowing another user to enjoy all of the features currently available on the local "base" TV set 15. The base transmitter unit 11 broadcasts the selected source signal and connects to the TV feed 16 and any other video source 17 desired by the user. The base transmitter unit 11 sends the video signal out at a high radio frequency. This ensures a high quality signal with minimal interference or distortion. The remote receiver unit 12 receives the signal broadcast from the base transmitter unit 11. The remote receiver unit 12 will generally be located near a remote TV set 14 that is not convenient to a cable TV outlet 18 or that does not have a DVD player or other desired video source 17 nearby that the user wants. The handheld remote control unit 13 controls the entire system 10, including the associated audio/visual equipment that the user already owns.

Figure 2:
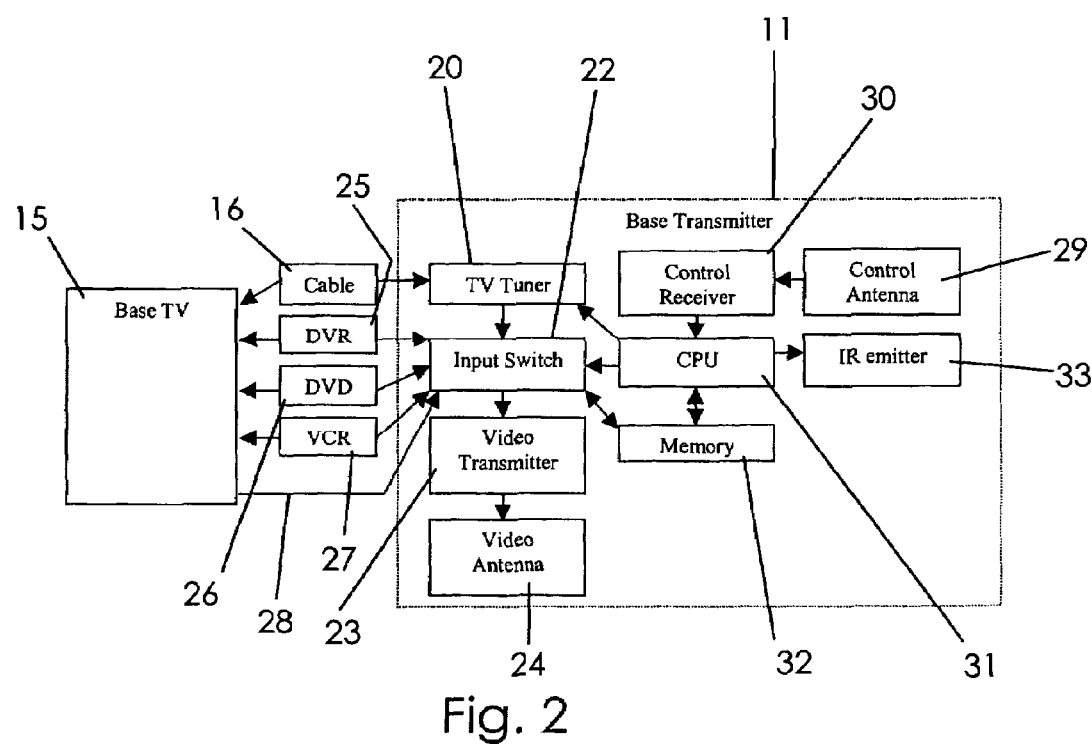
FIG. 2 is a block diagram showing the components of the base transmitter unit with arrows indicating information flowing among the components.

The components of the base transmitter unit 11 are shown in FIG. 2. The base transmitter unit 11 is the central component of the system 10 and acts as a hub for all of the video sources. The base transmitter unit 11 includes a TV tuner 20 connected to the cable TV feed 16, an input switch 22, a video transmitter 23, and a base video antenna 24. The input switch 22 has a plurality of inputs for receiving video signals from a variety of video sources, including the TV tuner 20. For example, the input switch 22 may receive video signals from a DVR 25, a DVD player 26 and a VCR 27, in addition to the TV tuner 20. These video sources are also connected direct to the base TV set 15 for viewing on the base TV set 15 without first passing through the base transmitter unit 11. This enables the base TV set 15 and the remote TV set 14 to show video from any of the video sources 25, 26, 27 independent from each other.

Ideally this system 10 would be able to directly broadcast the entire cable TV signal to the remote TV set 14. This would allow the tuner inside of the remote TV set 14 to be used. Unfortunately, there is too much information being transmitted over this cable line for a single transmitter to broadcast wirelessly. This is the reason that the base transmitter unit 11 needs the TV tuner 20. The TV tuner 20 is adjusted to the frequency of the selected cable TV channel and outputs only the selected channel to the input switch 22. This means that the video transmitter 23 only needs to broadcast the selected channel and greatly reduces the amount of data necessary to send.

The input switch 22 also receives video signals from a video output of the base TV set 15 via a cable 28 connected between the base TV set 15 and the input switch 22. As explained below, this allows the base transmitter unit 11 to be set to broadcast a video signal corresponding to the picture shown on the base TV set 15. The input switch 22 can also be connected to other common sources of audio/video signals, such as CD and cassette players and desktop computers.

The video transmitter 23 and base video antenna 24 operate together to broadcast a video signal from a video source 20, 25-28 selected by the input switch 22. The base video antenna 24 broadcasts the selected video signal via a wireless broadcast at a high radio frequency to ensure a high quality signal with minimal interference and distortion.

The base transmitter unit 11 also includes a base control antenna 29, a base control receiver 30, a CPU 31, a memory 32, and an infrared ("IR") emitter 33. The base control antenna 29 and base control receiver 30 operate to receive control signals broadcasted by the remote receiver unit 12, as explained below. The CPU 31 and memory 32 are programmed to use the received control signals to control the input switch 22 for selecting which video source 20, 25-28 will have its video signal passed to the video transmitter 23. The CPU 31 and memory 32 are also programmed to use the received control signals to control the TV tuner 20 for selecting a channel that will have its video signal passed to the input switch 22 from among a plurality of channels input to the TV tuner 20 from the cable TV feed 16. Finally, the CPU 31 and memory 32 can also be programmed to relay certain control signals to other electronic components, such as peripheral audio/video equipment 25, 26, 27, using the IR emitter 33. Thus, some of the remote signals are used to select the video source, others are used to change the channel of the TV tuner 20 in the base transmitter unit 11, while still others are relayed to the IR emitter 33 of the base transmitter unit 11 to control other electronic components 25, 26, 27.

Figure 3:
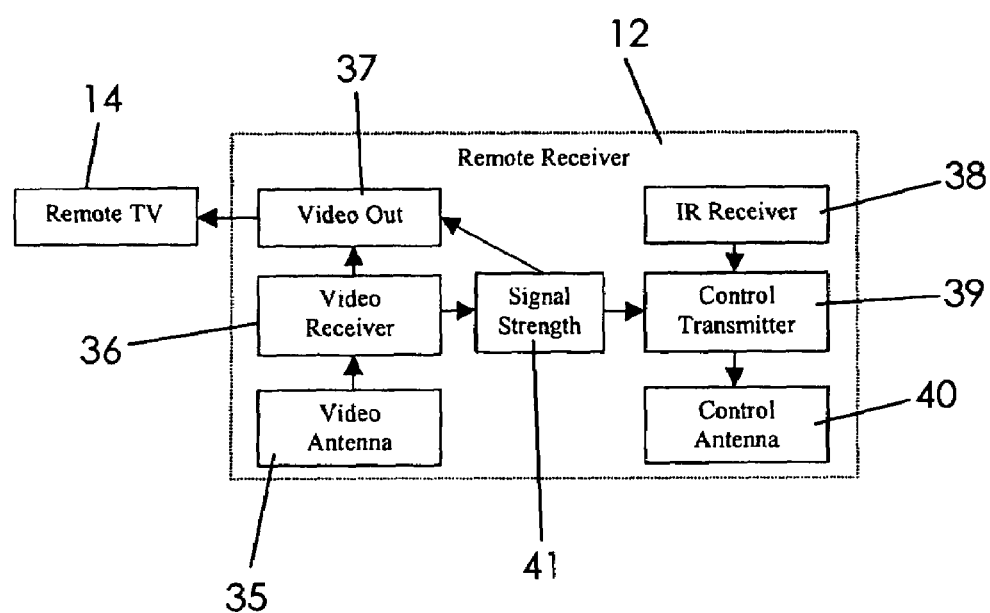
FIG. 3 is a block diagram showing the components of the remote receiver unit with arrows indicating information flowing among the components.

The components of the remote receiver unit 12 are shown in FIG. 3. The remote receiver unit 12 is connected to the remote TV set 14, which does not have convenient access to a cable outlet 18. By connecting the remote receiver unit 12 to the remote TV set 14, the remote TV set 14 can receive a video signal from any video source connected to the base transmitter unit 11. The remote receiver unit 12 includes a remote antenna 35, a video receiver 36, and a video out port 37. The video receiver 36 receives the broadcast video signal from the base transmitter unit 11 through the remote video antenna 35. The received video signal is then passed to the video out port 37 for input to the remote TV set 14.

The remote receiver unit 12 also includes an IR receiver 38 for receiving control signals from the handheld remote control unit 13. The IR receiver 38 is connected to a remote control transmitter 39 and a remote control antenna 40 in the remote receiver unit 12. In operation, the IR receiver 38, remote control transmitter 39 and remote control antenna 40 function to relay signals from the remote control unit 13 back to the base transmitter unit 11.

The remote receiver unit 12 also includes a signal strength indicator 41 that measures a strength of the video signal received from the base transmitter unit 11 to determine the quality of the signal. The signal strength indicator 41 has a first output connected to the remote control transmitter 39 and a second output connected to the video out port 37. The remote receiver unit 12 can be set in a signal strength mode in which the output of the signal strength indicator 41 passes through the video out port 37, and an onscreen value of the signal strength is displayed on the remote TV set 14. The control transmitter 39 of the remote receiver unit 12 is used to transmit a control signal indicating the signal strength back to the base transmitter unit 11 where it is displayed using a suitable interface, such as a liquid crystal display 42 or an arrangement of LEDs.

Figure 4:
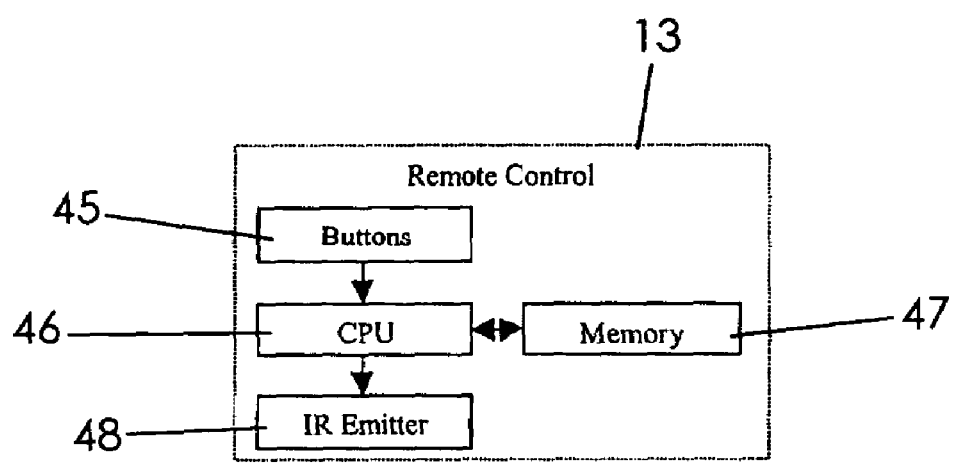
FIG. 4 is a block diagram showing the components of the handheld remote control unit.

The components of the handheld remote control unit 13 are shown in FIG. 4. The remote control unit 13 functions as a universal remote that allows the user to control the equipment located in both the base and remote locations. The remote control unit 13 includes a set of input buttons 45, a CPU 46, a memory 47, and an IR emitter 48. The CPU 46 and memory 47 enable the remote control unit 13 to "learn" the signals necessitated by each of the electronic components. The remote control unit 13 generates and emits IR control signals necessary for the control in the system 10.

IR signals are beyond the wavelength of visible light, and are commonly used for remote controls. However, because IR communication is limited to line of sight, this is not a suitable method for communicating between the base transmitter unit 11 and the remote receiver unit 12 located in different rooms. The present invention solves this problem by converting the IR signal from the remote control unit 13 into a radio frequency broadcast at the remote receiver unit 12, and then regenerating the IR signal in the base room by use of the IR emitter 33 in the base transmitter unit 11. That is, the IR control signals emitted by the remote control unit 13 are received by the IR receiver 38 of the remote receiver unit 12, and the control signals are then transmitted via a wireless broadcast to the base transmitter unit 11 using the remote control transmitter 39 and remote control antenna 40 of the remote receiver unit 12. The control signals broadcast from the remote receiver unit 12 are received by the base control antenna 29 and base control receiver 30 of the base transmitter unit 11. This allows the DVR 25, DVD player 26, VCR 27 and other components, as well as the video source selection by the input switch 22 and the channel selection by the TV tuner 20, to be controlled from the remote location using the remote control unit 13.

Programming the remote control unit 13 can be done in a couple of ways. First, by using the original remote for each of the various electronic components to send the necessary signal, one of the input buttons 45 on the remote control unit 13 can be correlated to that function. Second, the memory 47 of the remote control unit 13 can be programmed to store the codes of a variety of remotes on the market. By the user selecting the type of equipment to be controlled, the remote control unit 13 can store this in memory and use this information to send the correct type of IR signal for that equipment.

The FCC regulates the range of radio frequencies that a device can produce. Some of the frequency bands available for these consumer products are around 50 KHz, 433 MHz, 900 MHz and 2.4 GHz. The higher frequencies are better able to transmit long distances and through obstacles. These frequencies are further broken down into channels, which are smaller increments of the broader frequency band. The transmitter and receiver must both be tuned to the same channel to communicate. In the present invention, the video transmitter 23 continuously sends a signal while the system 10 is on, and the remote control transmitter 39 sends a control signal back intermittently. This system 10 preferably uses both of these transmitters 23, 39 in the same frequency range on different channels. This ensures that both signals are able to transmit the distance and through the obstacles that exist between the two locations. The lower frequency transmitters and receivers are generally cheaper, and thus could be used for a lower cost model of this system.

A relatively new technology on the market is "spread spectrum" to improve transmission quality and lower interference. In this situation, both the transmitter and the receiver tune to the same frequency and change simultaneously to a new frequency rapidly and frequently. With this system, both the video frequency and the control frequency can use this spread spectrum technology to improve the communication.

The system of the present invention enables a user to watch any show available at any TV set in the house. The combination of components allows the user to do this conveniently. The base transmitter unit 11 is the critical hub of the system where the video source is selected and the video signal is transmitted by a wireless broadcast. The IR emitter 33 at the base transmitter unit 11 allows the control of other audio/visual components associated with the base TV set 15, including the DVR 25, DVD player 26, and VCR 27. The base transmitter unit 11 sends the video signal out, which is received by the remote receiver unit 12. The remote receiver unit 12 connects to the remote TV set 14 to display the broadcast video. The remote receiver unit 12 receives the video signal using the remote video antenna 35 and remote video receiver 36, and sends a control signal back to the base transmitter unit 11 using the control transmitter 39 and remote control antenna 40. The handheld remote control unit 13 operates in conjunction with the IR receiver 38 and control transmitter 39 of the remote receiver unit 12 and the control receiver 30 and IR emitter 33 of the base transmitter unit 11 to provide a convenient method of controlling the various electronic components.

The present invention has been described as a system for distributing video signals by wireless transmission to remotely positioned TV sets. However, it will be understood by those skilled in the art that audio signals will also be distributed in conjunction with the video signals. The invention has been described in connection with video signals because video signals require much more data to be transmitted, which is the reason that the base transmitter unit 11 includes the TV tuner 20 and the input switch 22.

While the invention has been specifically described in connection with specific embodiments thereof, it is to be understood that this is by way of illustration and not of limitation, and the scope of the appended claims should be construed as broadly as the prior art will permit.

Having thus described the invention, what is claimed as new and desired to be secured by Letters Patent is as follows:

1. A cable to wireless conversion system for distributing video signals by wireless in-home transmission to a remotely positioned TV set, comprising:

a base transmitter unit comprising a TV tuner, an input switch, a video transmitter, a base video antenna, a base control antenna, a base control receiver, a base unit display, and a CPU, said TV tuner being operable to select a channel from among a plurality of channels contained in a cable TV signal, said input switch being operable to select one of a plurality of video signals received from a plurality of video sources including said TV tuner, said video transmitter and said base video antenna being operable to transmit the selected video signal via a wireless broadcast of radio signals in the 2.4 GHz frequency range on one channel and broadcasting continuously;

a remote receiver unit comprising a remote video antenna, a video receiver, a video out port, an IR receiver, a remote control transmitter, and a remote control antenna, said remote video antenna and said video receiver being operable to receive the video signal broadcast by said base transmitter unit and pass the video signal to the video out port for input to the remotely positioned TV set;

a handheld remote control unit comprising a set of input buttons, a CPU, a memory, and an IR emitter, said remote control unit being operable to generate and emit IR control signals for sending to the base transmitter unit via the remote receiver unit;

said IR receiver of the remote receiver unit being operable to receive IR control signals from the remote control unit, and said remote control transmitter and remote control antenna of said remote receiver unit being operable to broadcast the control signals to the base transmitter unit for controlling the video source selection of the input switch and the channel selection of the TV tuner, said IR control signals being broadcast in the 2.4 GHz frequency range and broadcasting intermittently on a channel different than said one channel; and means for repeatedly tuning the video transmitter and the video receiver to one same frequency and then changing the one same frequency to another same frequency that is different from the one same frequency; and wherein said remote receiver unit comprises a signal strength indicator operable to measure a strength of the video signal received from the base transmitter unit, said signal strength indicator having a first output connected to the remote control transmitter for transmitting a control signal indicative of said signal strength back to the base transmitter unit for displaying a value of the signal strength on said base unit display, and said signal strength indicator having a second output connected to the video out port of the remote receiver unit for displaying a value of the signal strength on the remote TV set when the remote receiver unit is placed in a signal strength mode.

* * * * *